United States Patent

Mumma

[11] Patent Number: 5,507,533
[45] Date of Patent: Apr. 16, 1996

[54] HOSE CONNECTOR

[76] Inventor: Donald Mumma, 1028 S. Sundane Dr., Anaheim Hill, Calif. 92808

[21] Appl. No.: 357,434

[22] Filed: Dec. 15, 1994

[51] Int. Cl.$^6$ ............................................. F16L 13/04
[52] U.S. Cl. ........................... 285/114; 285/117; 285/902
[58] Field of Search ........................... 285/114, 117, 285/902

[56] References Cited

U.S. PATENT DOCUMENTS

| 378,284 | 2/1888 | Briscoe | 285/117 X |
| 1,558,878 | 10/1925 | Hitchcock | 285/114 |
| 2,006,194 | 6/1935 | Bertschinger | 285/114 X |
| 3,179,442 | 4/1965 | Lofgren | 285/114 X |
| 3,197,240 | 7/1965 | Lindberg | 285/114 |
| 3,291,507 | 12/1966 | Clay | 285/114 |
| 3,859,692 | 1/1975 | Waterman | 285/117 X |

*Primary Examiner*—Dave W. Arola
*Attorney, Agent, or Firm*—James E. Brunton

[57] ABSTRACT

A tethering apparatus for use with garden hoses to prevent the sprinkling nozzle from becoming lost or misplaced after having been disconnected from the hose connector. The apparatus includes a hub-like member which can be connected to the sprinkling nozzle and a securement ring which is adapted to be connected to the garden hose. A connector cable securely interconnects the hub-like member with the securement ring so as to prevent accidental loss of the nozzle.

12 Claims, 4 Drawing Sheets

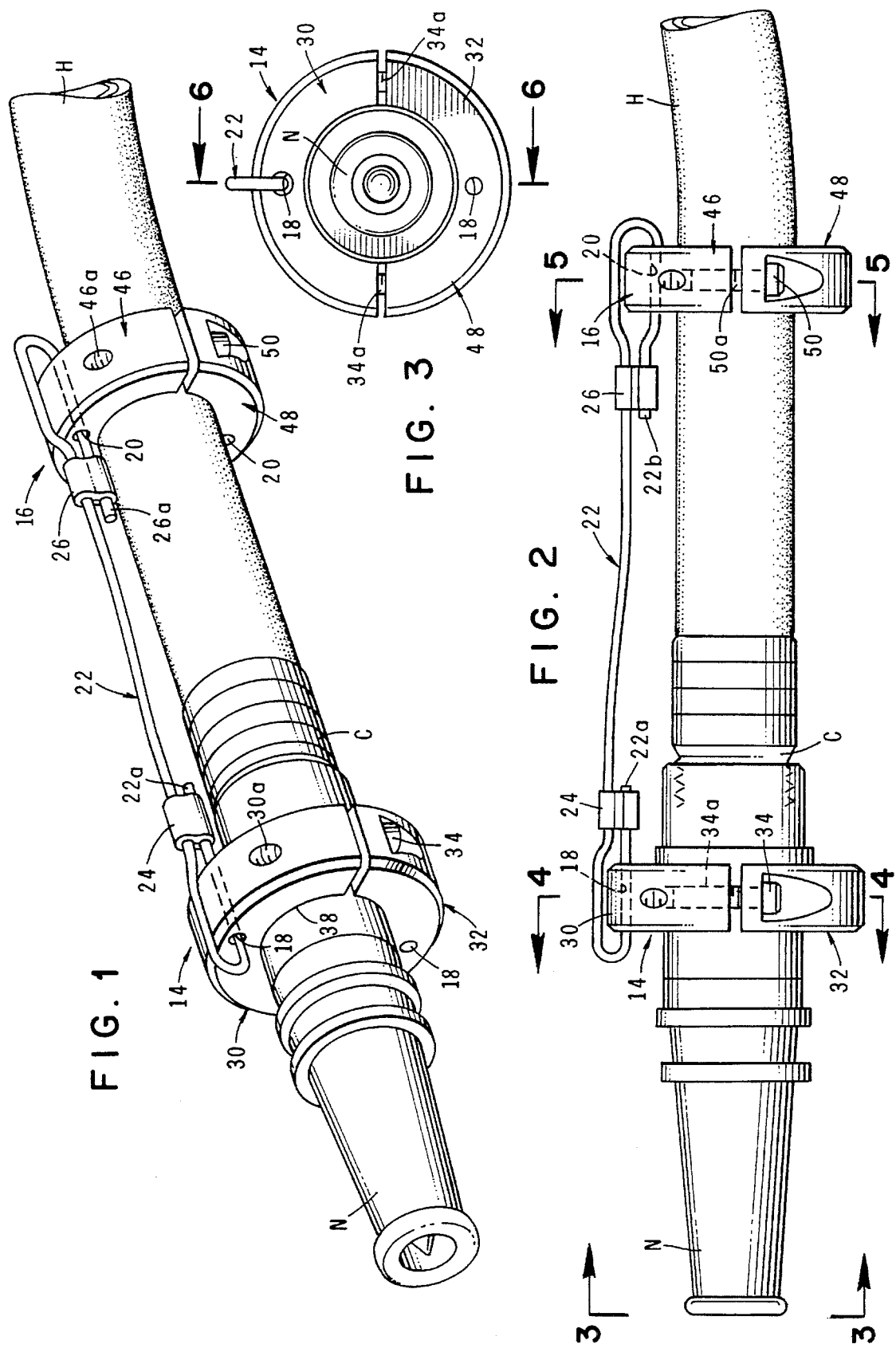

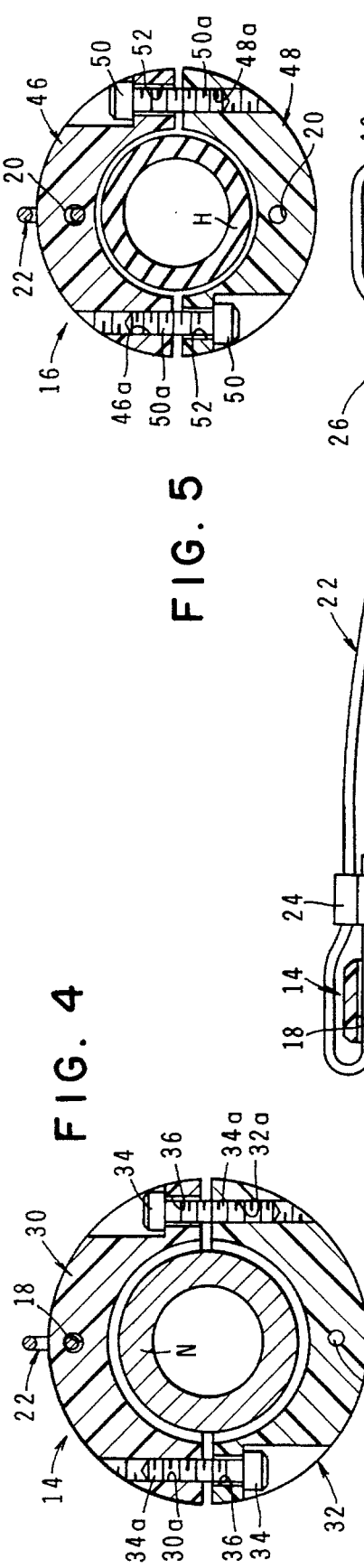
FIG. 4
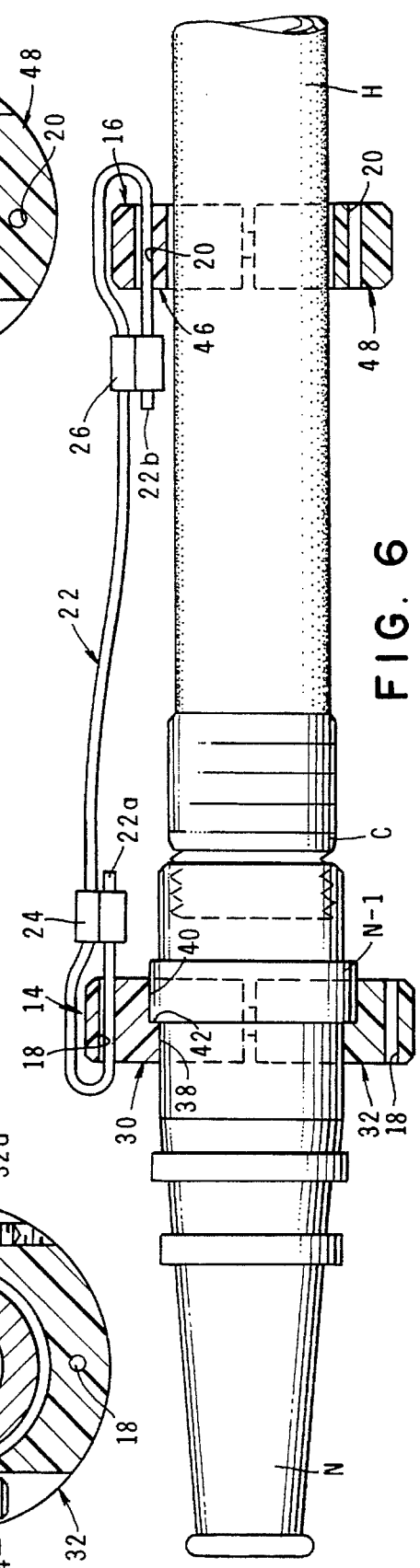
FIG. 5
FIG. 6
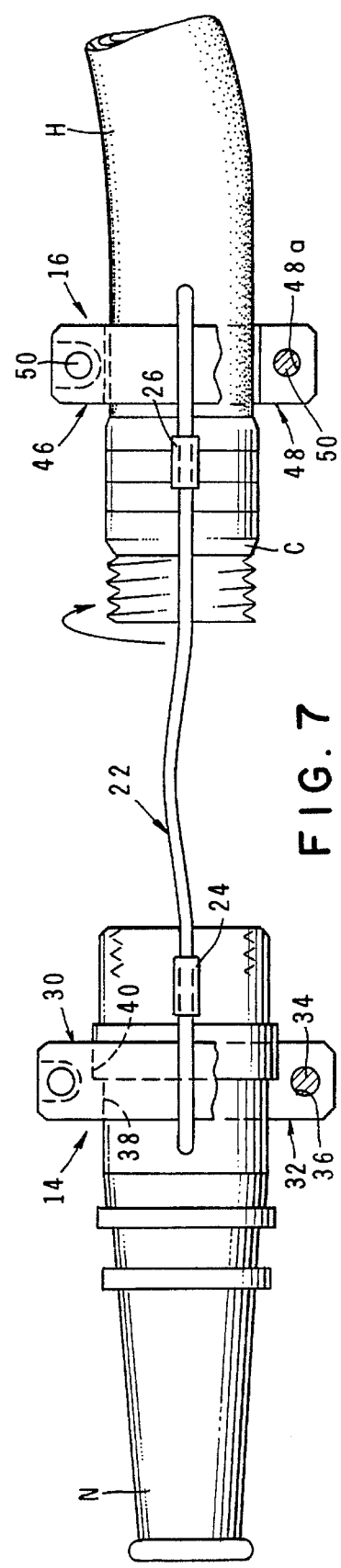
FIG. 7

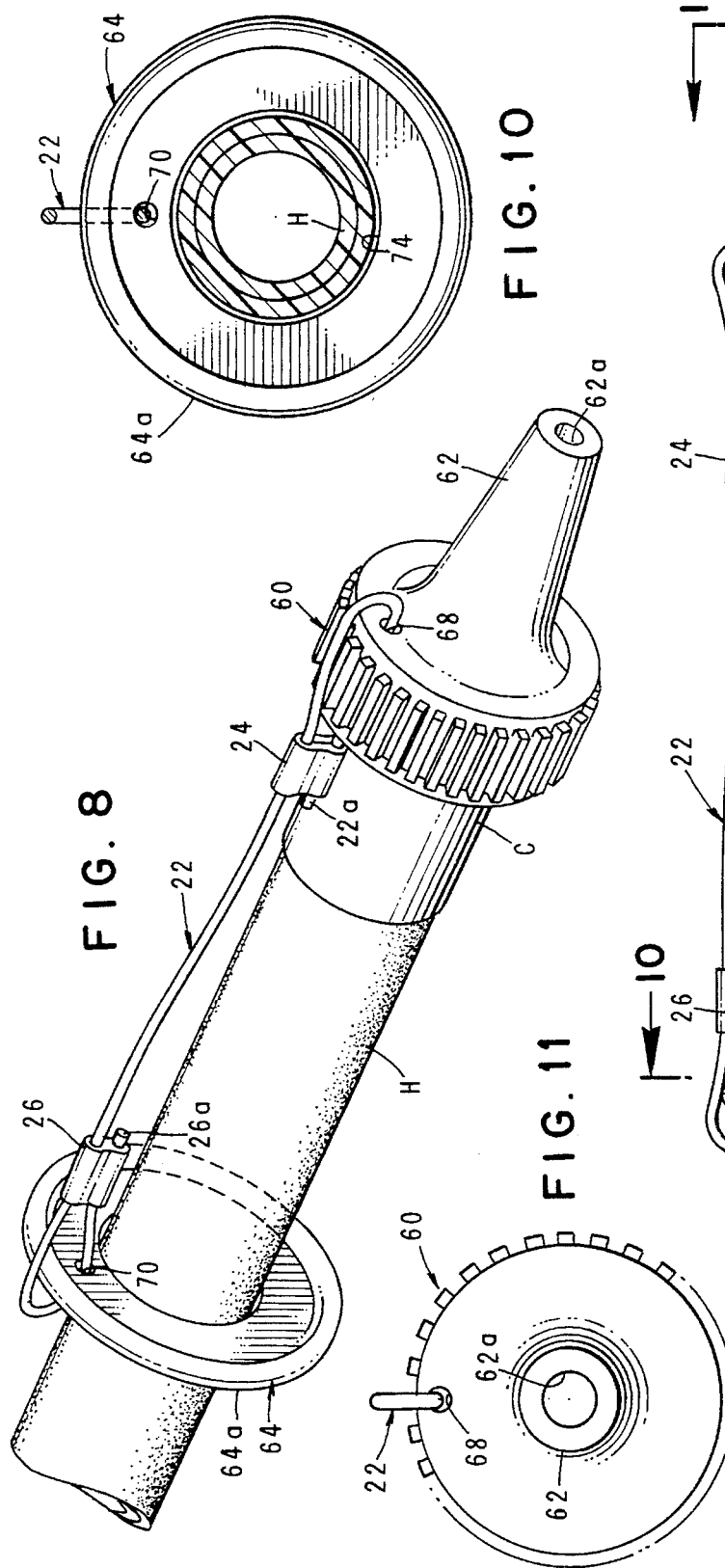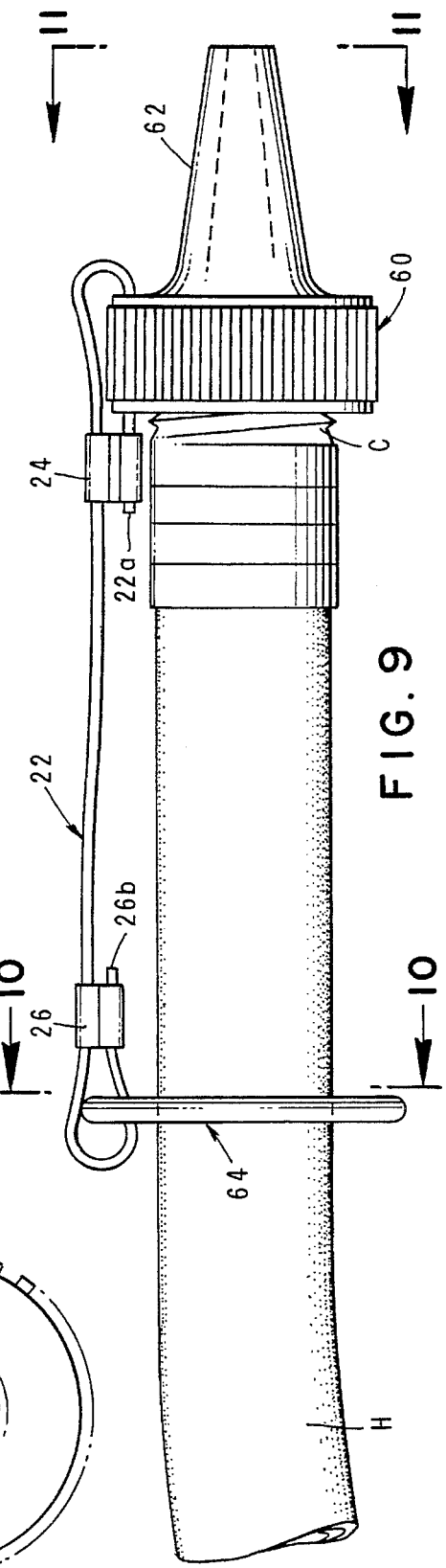

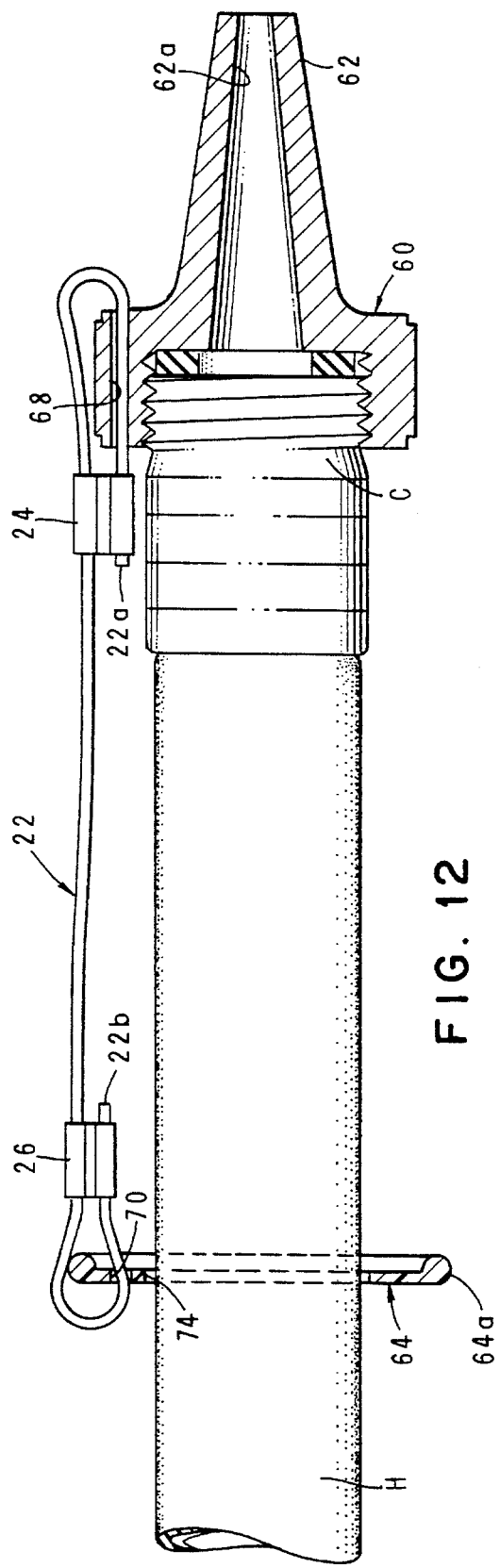
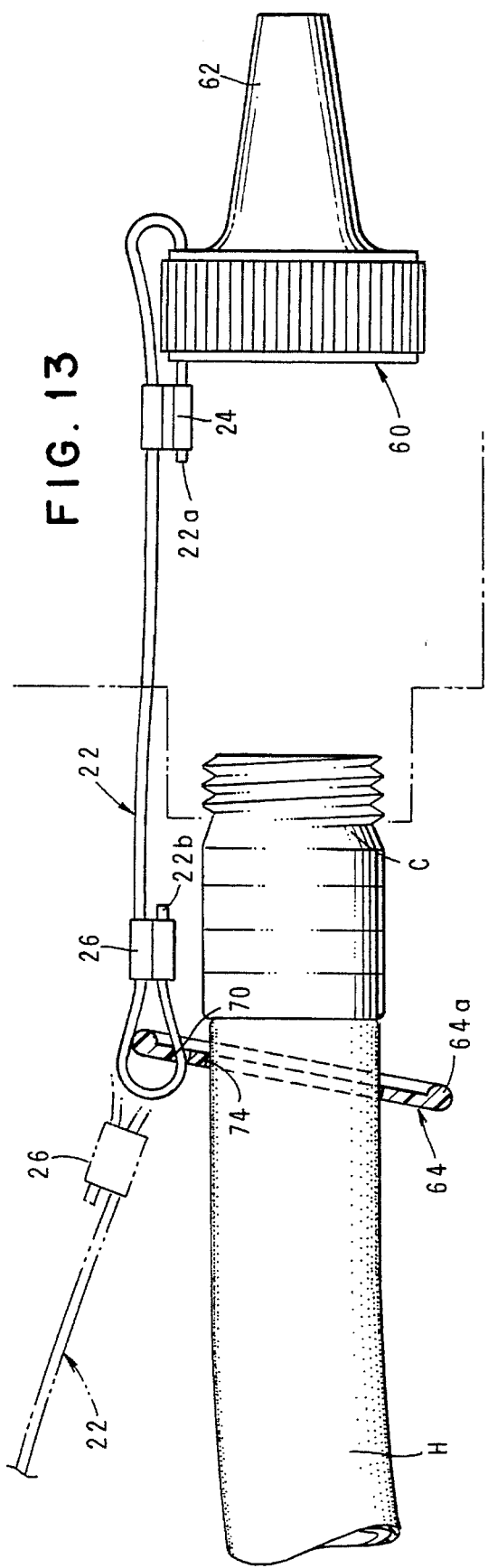

HOSE CONNECTOR

BACKGROUND OF THE INVENTION

1. Field of the Invention

The present invention relates generally to tethering devices. More particularly, the invention concerns an apparatus for use with a garden hose to prevent the sprinkling nozzle from being lost after it has been removed from the threaded outlet of the garden hose.

2. Discussion of the Invention

The typical commercially available garden hose comprises a long length of flexible hose having at one end a connector for connecting the hose to a source of water under pressure. At its other end, the garden hose is typically provided with a threaded outlet connector to which sprinkling devices, such as a sprinkling nozzle, can be removably connected.

Often, after the sprinkling nozzle is removed from the hose, it is laid on the ground or on an adjacent structure and is easily lost. The thrust of the present invention is to provide a novel tethering apparatus which prevents the nozzle from being separated from the hose when not being used and then becoming lost or misplaced. More particularly, in accordance with the present invention, the nozzle remains tethered to the hose after being removed from the threaded outlet of the hose so that it is at all times readily available for reuse. The tethering arrangement is specifically designed so that it will permit free rotation of the nozzle relative to the hose connector.

In the past, several devices have been suggested which tether caps to bottles and tubes to prevent loss of the cap. Exemplary of such devices is the device disclosed in U.S. Pat. No. 2,155,329 issued to Perdue. In U.S. Pat. No. 4,004,614 a somewhat similar tethering arrangement is disclosed which prevents a closure plug from being separated from an inflatable article. However, these prior art patents have nothing to do with garden hoses and neither discloses nor suggests the tethering apparatus of the present invention as described and claimed herein.

SUMMARY OF THE INVENTION

By way of summary, one form of the tethering apparatus of the present invention comprises a hub-like member which is adapted to be connected to the sprinkling nozzle and a securement ring which is adapted to be connected to the garden hose. Both the hub-like member and the securement ring are provided with axially extending bores which accept the ends of a connector cable that functions to securely interconnect the hub-like member with the securement ring. In one embodiment of the invention, a nozzle portion, which communicates with the garden hose, is integrally formed with the hub-like member.

With this description in mind, it is an object of the present invention to provide a novel tethering apparatus which can be used with garden hoses to prevent sprinkling nozzles and like articles from becoming lost after they have been disconnected from the hose connector.

Another object of the invention is to provide an apparatus of the aforementioned character, which is of simple construction, is easy to use, and will last for the lifetime of the garden hose.

Another object of the invention is to provide a tethering apparatus which is readily usable with any garden hose of standard construction.

Another object of the invention is to provide a tethering apparatus as described in the preceding paragraphs which is of sturdy construction and one which can be inexpensively manufactured.

DESCRIPTION OF THE DRAWINGS

FIG. 1 is a generally perspective view of one embodiment of the tethering apparatus of the present invention shown interconnected with a garden hose of conventional design.

FIG. 2 is a side-elevational view of the apparatus of FIG. 1.

FIG. 3 is a view taken along lines 3—3 of FIG. 2.

FIG. 4 is a cross-sectional view taken along lines 4—4 of FIG. 2.

FIG. 5 is a cross-sectional view taken along lines 5—5 of FIG. 2.

FIG. 6 is a cross-sectional view taken along lines 6—6 of FIG. 3.

FIG. 7 is an exploded view similar to FIG. 2, but showing the hub-like connector of the apparatus separated from the garden hose.

FIG. 8 is a generally perspective view of an alternate embodiment of the invention.

FIG. 9 is a side-elevational view of the form of the invention shown in FIG. 8.

FIG. 10 is a cross-sectional view taken along lines 10—10 of FIG. 9.

FIG. 11 is a view taken along lines 11—11 of FIG. 9.

FIG. 12 is a side-elevational, cross-sectional view of the apparatus shown in FIG. 9.

FIG. 13 is an exploded view similar to FIG. 9, but showing the nozzle portion of the apparatus separated from the garden hose.

Referring to the drawings and particularly to FIGS. 1 through 7, one form of the tethering apparatus of the invention is there shown. The apparatus of the invention is specially adapted for use with a garden hose "H" of conventional design having a generally tubular shaped, threaded connector "C" to which sprinkling devices such as a sprinkling nozzle "N" can be removably connected (FIG. 1). In the instant form of the invention, the apparatus comprises an annular shaped hub assembly 14, which is interconnected with the watering nozzle portion "N", a securement ring assembly 16, which is connectable with the garden hose "H" for free rotation with respect thereto, and interconnection means for interconnecting hub assembly 14 and securement ring assembly 16.

As best seen in FIGS. 1 and 2, the peripheral portions of hub assembly 14 and securement ring assembly 16 are both provided with axially extending bores 18 and 20 respectfully. In the form of the invention shown in these figures, the interconnection means comprises an elongated line or cable 22 having free end portions 22a and 22b. End 22a is receivable through bore 18 of assembly 14 while end 22b is receivable through bore 20 of assembly 16. After end portion 22a of the cable is threaded through bore 18, it is interconnected with the central body portion of the cable by a clamp type connector 24. Similarly, after end 22b of the cable is threaded through bore 20, it is interconnected with the central body portion of the cable by means of a clamp type connector 26. With this construction, annular shaped hub assembly 14 and securement ring assembly 16 are securely interconnected together.

Referring to FIG. 4, it is to be noted that annular shaped hub assembly 14 comprises first and second releasably interconnected, generally semi-circular shaped segments 30 and 32. Segments 30 and 32 are provided with internally threaded portions 30a and 32a respectively which are adapted to threadably receive fasteners 34. Each of the fasteners 34 has a threaded shank 34a which extends through a clearance hole 36 that is provided in each of the segments 30 and 32. By unthreading fasteners 34, segments 30 and 32 can be separated so that they can be placed in encircling engagement with nozzle "N". In this regard, it is to be noted that, when segments 30 and 32 are interconnected by fasteners 34, a central bore is defined. This central bore comprises a first bore 38 of a first diameter and a second bore 40 of a second larger diameter. Bores 38 and 40 cooperate to define an internally disposed shoulder 42. With this construction, an enlarged diameter, ring-like portion N-1 which is normally provided on standard watering nozzles such as nozzle "N" is closely receivable within bore 40. Ring-like portion N-1 includes a peripheral surface which will engage shoulder 42 when the parts are mated in the manner shown in FIG. 6.

In assembling annular shaped hub assembly 14 with nozzle "N", fasteners 34 are first loosened so that segments 30 and 32 can encircle the nozzle "N". The segments are then moved together and positioned longitudinally of the nozzle "N" so that enlarged diameter portion N-1 engages shoulder 42. With the segments in this position, fasteners 34 can be conveniently tightened so as to securely clamp assembly 14 in a fixed position relative to nozzle "N" in the manner shown in FIGS. 1, 2, and 6.

Referring particularly to FIG. 5, it is to be noted that securement ring assembly 16 also comprises first and second releasably interconnected, generally semi-circular shaped segments 46 and 48 respectively. Segments 46 and 48 are provided with internally threaded portions 46a and 48a respectively which are adapted to threadably receive fasteners 50. Each of the fasteners 50 has a threaded shank 50a which extends through a clearance hole 52 that is provided in each of the segments 46 and 48. By loosening fasteners 50, segments 46 and 48 can be separated so that they can be placed in an encircling relationship with garden hose "H" (FIG. 6). It is to be noted that, when segments 46 and 48 are interconnected by fasteners 50, a central bore is defined which is of a diameter slightly larger than the diameter of the garden hose so that the securement ring assembly is free to slide axially and to rotate relative to the hose. With this construction, securement ring assembly 16 can conveniently be moved from the first position shown in FIG. 6 to the second position shown in FIG. 7 thus enabling nozzle "N" to be threadably disconnected from hose connector portion "C" (FIG. 7).

During the disconnection of the nozzle "N" from the garden hose, the securement ring assembly 16 is free to rotate relative to the hose. Once the nozzle "N" is separated from the hose connector "C", the interconnection means, or cable 22 will function to securely connect together the nozzle "N" and the securement ring 16. In this way, inadvertent misplacing of nozzle "N" is effectively avoided.

Turning now to FIGS. 8 and 15, an alternate form of the tethering apparatus of the invention is there shown. This form of the invention is similar in some respects to the earlier described embodiment and like numbers have been used to identify like components. This latest form of the invention is also adapted for use with a garden hose "H" of conventional design having a generally tubular shaped, threaded connector "C" to which sprinkling devices can be removably connected. The apparatus here comprises an internally threaded, annular shaped hub 60, which is integrally formed with a watering nozzle portion 62 and a securement ring 64 having a peripheral bead 64a. Securement ring 64 is connectable with the garden hose "H" for free rotation with respect thereto. Interconnection means similar to that previously described is provided for interconnecting annular shaped hub 60 with securement ring 64.

As best seen in FIGS. 8 and 9, the peripheral portions of annular shaped hub 60 and securement ring 64 are provided with axially extending bores 68 and 70 respectfully. In this latest form of the invention, the interconnection means also comprises an elongated line or cable 22 having free end portions 22a and 22b. End 22a is receivable through bore 68 of hub 60 while end 22b is receivable through bore 70 of ring 64. After end portion 22a of the cable is threaded through bore 68, it is interconnected with the central body portion of the cable by a clamp type connector 24. Similarly, after end 22b of the cable is threaded through bore 70, it is interconnected with the central body portion of the cable by means of a clamp type connector 26. With this construction, hub 68 and securement ring 64 remain securely interconnected together.

Referring to FIG. 12, it is to be noted that in this latest form of the invention annular shaped hub 60 is internally threaded so that it can be connected directly to the hose connector "C". When so connected, passageway 62a of nozzle 62 is in direct communication with the internal flow passageway of the hose "H".

As best seen by referring to FIGS. 10 and 12, securement ring 64 is constructed from a yieldably deformable plastic and includes a central opening 74 having a diameter slightly smaller than the diameter of connector "C" of the garden hose but slightly larger than the diameter of the hose "H". With this construction, securement ring 64 can be deformed slightly so as to slide over connector "C" and then encircle hose "H" where it is free to rotate relative to the hose and is also free to move axially from a first position shown in FIG. 12 to a second position shown in FIG. 13. As shown in FIG. 13, hub 60 can readily be disconnected from connector "C" and then moved away therefrom. However, because hub 60 is interconnected with securement ring 64 by means of cable 22, misplacement of the hub and nozzle combination of this form of the invention is positively prevented.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A tethering apparatus for use with a garden hose having an outside diameter and a generally tubular shaped, threaded connector having an outside diameter larger than the outside diameter of the garden hose, the threaded connector being interconnectable with a watering nozzle portion, said apparatus comprising:
   (a) an annular shaped hub, including means for connecting said hub to the watering nozzle portion;
   (b) a securement ring slidably receivable over the garden hose for rotation with respect thereto; said securement ring includes a central opening having a diameter slightly smaller than the outside diameter of the generally tubular shaped threaded connector of the garden hose, but slightly larger than the outside diameter of the hose whereby said securement ring is slidable over the garden hose, but not over the threaded connector; and (c) interconnection means for interconnecting said annular shaped hub and said securement ring.

2. A device as defined in claim 1 in which said annular shaped hub and said securement ring both have peripheral portions provided with a bore and in which said interconnecting means comprises a line having a first end receivable within said bore of said annular shaped hub and a second end receivable within said bore of said securement ring.

3. A device as defined in claim 1 in which said means comprises a rigid connection between said annular shaped hub and said watering nozzle portion.

4. A device as defined in claim 1 in which both said annular shaped hub and said securement ring comprise first and second semi-circular shaped segments and further include means for connecting said segments together.

5. A device as defined in claim 1 in which said securement ring is constructed from a yieldably deformable plastic.

6. A device as defined in claim 1 in which said annular shaped hub includes a central opening of a first diameter and an adjacent central opening of a second diameter which openings cooperate to define and interiorly disposed shoulder.

7. A tethering apparatus for use with a garden hose having an outside diameter and including a generally tubular shaped threaded connector having an outside diameter larger than the diameter of the garden hose and a water nozzle portion connectable with said tubular shaped threaded connector, said apparatus comprising:

(a) a generally annular shaped hub assembly comprising first and second releasably interconnected, generally semicircular shaped segments, said hub assembly being interconnectable with the watering nozzle portion;

(b) a securement ring connectable with the garden hose, said securement ring comprising first and second interconnectable segments circumscribing said garden hose and slidable with respect thereto, said segments defining an opening smaller in diameter than the diameter of the threaded connector so that passage thereover is blocked; and (c) interconnection means for interconnecting said hub and said securement ring.

8. A device as defined in claim 7 in which said interconnection means comprises an elongated cable having a first end connected to said hub and a second end connected to said securement ring.

9. A device as defined in claim 7 in which said securement ring further comprises means for interconnecting said first and second segments of said segments, said means comprising a pair of threaded fasteners.

10. A tethering apparatus for use with a garden hose having an outside diameter and a generally tubular shaped threaded connector having an outside diameter, said apparatus comprising:

(a) a threaded hub threadably interconnected with to the threaded connector of the garden hose, said hub having a peripheral portion provided with a bore therethrough;

(b) a securement ring having a central opening having a diameter slightly greater than the outside diameter of the hose and slightly smaller than the outside diameter of the generally tubular shaped threaded connector, said securement ring having a peripheral portion provided with a bore therethrough; and (c) a connector cable having a first end extending through said bore in said rim of said threaded hub and a second end extending through said bore in said peripheral portion of said securement ring.

11. An apparatus as defined in claim 10 in which said threaded hub includes a nozzle portion having a water passageway in communication with the garden hose.

12. An apparatus as defined in claim 10 in which said threaded hub and said watering nozzle portion are integrally formed.

\* \* \* \* \*